(12) United States Patent
Wang et al.

(10) Patent No.: US 8,340,191 B2
(45) Date of Patent: Dec. 25, 2012

(54) TRANSCODER FROM FIRST MPEG STREAM TO SECOND MPEG STREAM

(75) Inventors: Limin Wang, San Diego, CA (US); Krit Panusopone, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 478 days.

(21) Appl. No.: 12/567,118

(22) Filed: Sep. 25, 2009

(65) Prior Publication Data
US 2011/0075738 A1  Mar. 31, 2011

(51) Int. Cl.
*H04N 7/12* (2006.01)
(52) U.S. Cl. ............ 375/240.17; 375/240.16; 375/240.2
(58) Field of Classification Search .................. None
See application file for complete search history.

(56) References Cited

U.S. PATENT DOCUMENTS

| | | | |
|---|---|---|---|
| 6,441,754 B1 | 8/2002 | Wang et al. | |
| 6,647,061 B1 * | 11/2003 | Panusopone et al. .... | 375/240.12 |
| 7,330,509 B2 * | 2/2008 | Lu et al. ................ | 375/240.03 |
| 7,486,724 B2 | 2/2009 | Gao et al. | |
| 2004/0013195 A1 | 1/2004 | Panusopone et al. | |
| 2004/0081237 A1 * | 4/2004 | Kingsley .................. | 375/240.13 |
| 2004/0081242 A1 * | 4/2004 | Segev ...................... | 375/240.25 |
| 2007/0002946 A1 * | 1/2007 | Bouton et al. .......... | 375/240.01 |
| 2007/0064801 A1 | 3/2007 | Wang et al. | |
| 2007/0081587 A1 * | 4/2007 | Raveendran et al. ...... | 375/240.1 |
| 2008/0101473 A1 * | 5/2008 | Tanaka et al. ............ | 375/240.16 |
| 2008/0112483 A1 * | 5/2008 | Lu et al. ................. | 375/240.03 |
| 2008/0187046 A1 * | 8/2008 | Joch et al. ............... | 375/240.16 |
| 2008/0219356 A1 * | 9/2008 | Johar et al. .............. | 375/240.24 |
| 2009/0097560 A1 * | 4/2009 | Robertson ................ | 375/240.16 |
| 2009/0180532 A1 * | 7/2009 | Zhang et al. ............ | 375/240.01 |
| 2010/0020886 A1 * | 1/2010 | Raveendran et al. .... | 375/240.27 |

OTHER PUBLICATIONS

PCT Search Report & Written Opinion, RE: Application #PCT/US2010/048564; Nov. 15, 2010.

\* cited by examiner

*Primary Examiner* — Michael J. Moore, Jr.
(74) *Attorney, Agent, or Firm* — Thomas A. Ward

(57) ABSTRACT

A system is configured to transcode a first MPEG stream to a second MPEG stream. The system includes a first MPEG decoder capable of decoding the first MPEG stream and a second MPEG encoder capable of producing the second MPEG stream. The second MPEG encoder is configured to maintain a decoded picture type of I, P, or B. The second MPEG encoder is also configured to maintain a decoded picture structure of frame or field, identify a metadata per each macroblock (MB) pair of an MB pair of the first MPEG stream, and determine whether to re-encode the MB into the second MPEG stream using one of a frame or a field mode based on the identified metadata. The second MPEG encoder is further configured to re-encode the MB pair into the second MPEG stream using one of the frame or the field mode based on the identified metadata.

23 Claims, 11 Drawing Sheets

TRANSCODER FROM FIRST MPEG STREAM TO SECOND MPEG STREAM

BACKGROUND

For a MPEG-2 to MPEG-2 transcoder, the decoded information, such as code modes and motion vectors (MVs), are often re-used in re-encoding in order to speed the processing. However, for a MPEG-2 to MPEG-4 (Also referred to as Advanced Video Coding (AVC), MPEG-4 part 10 or H.264) transcoder, the decoded MPEG-2 information, such as code modes and MVs, cannot be directly re-used in MPEG-4 encoder because MPEG-2 and MPEG-4 are two different standards. For example, MPEG-2 standard supports two partition sizes, 16×16 for frame block and 8×16 for field block. On the other hand, MPEG-4 supports four macroblock (MB) level partitions of 16×16, 16×8, 8×16 and 8×8, and four sub-MB level partitions of 8×8, 8×4, 4×8 and 4×4 in both frame and field. Thus, the partition sizes between MPEG-2 and MPEG-4 are typically not compatible.

As a result of the differences between code modes, MVs and other differences between MPEG-2 and MPEG-4, in order to view information encoded in an MPEG-2 stream in an MPEG-4 format, a transcoder is required to fully decode from MPEG-2 to baseband and then fully re-encode from baseband to MPEG-4. The current MPEG-2 to MPEG-4 transcoder is equivalent to a full MPEG-2 decoder followed by a full MPEG-4 encoder. The current process therefore requires significant processing resources because MPEG-4 is a complicated standard and is costly to fully encode.

SUMMARY

Disclosed herein is a method for transcoding a first MPEG stream to a second MPEG stream, according to an embodiment. In the method, a first MPEG stream is received and decoded at a first MPEG decoder. In addition, a decoded picture type of I, P, or B and a decoded picture structure of frame or field is maintained in a second MPEG encoder. The second MPEG encoder also identifies a metadata of the first MPEG stream and determines whether to re-encode the MB into the second MPEG stream using one of the frame or the field mode based on the identified metadata. The second MPEG encoder then re-encodes an MB of a picture into the second MPEG stream using the determined frame or the field mode.

An apparatus in accordance with the invention may include a first MPEG decoder configured to decode the first MPEG stream and a second MPEG encoder configured to encode the second MPEG stream. The second MPEG encoder is also configured to maintain a decoded picture type of I, P, or B, maintain a decoded picture structure of frame or field, identify a metadata of the first MPEG stream, determine whether to re-encode the MB in the second MPEG stream using one of the frame or the field mode based on the identified metadata, and re-encode the MB using the determined frame or field mode.

Still further disclosed is a computer readable storage medium on which is embedded one or more computer programs implementing the above-disclosed method of transcoding a first MPEG stream to a second MPEG stream, according to an embodiment.

Embodiments of the present invention provide a transcoder that does not need to fully decode an MPEG-2 to baseband and then fully re-encode the baseband to MPEG-4. Instead, information needed for the MPEG-4 encoding is derived from information decoded from the MPEG-2 stream. As a result of having the derived information, which includes decisions on coding modes and MVs for MPEG-4, only partial encoding is needed to convert to MPEG-4, which significantly reduces the re-encoding costs.

BRIEF DESCRIPTION OF THE DRAWINGS

Features of the present invention will become apparent to those skilled in the art from the following description with reference to the figures, in which.

DETAILED DESCRIPTION

Figure 1:
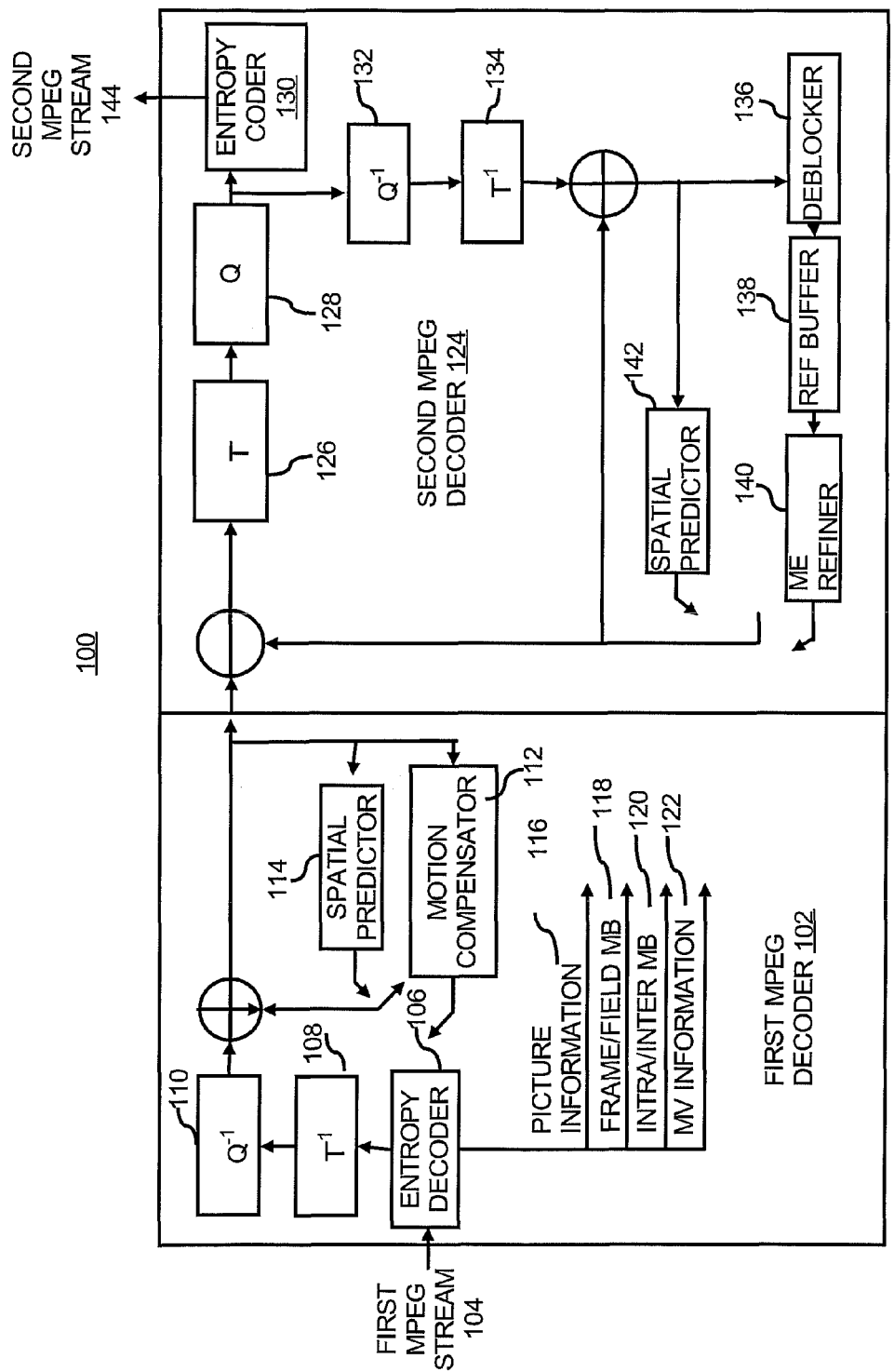
FIG. 1 illustrates a simplified block diagram of a transcoder configured to transcode a first MPEG stream to a second MPEG stream, according to an embodiment of the invention.

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

The term "MPEG stream," as used herein, refers to a time series of bits into which audio and/or video may be encoded in an MPEG format. MPEG is a group of formats that is defined by the Motion Picture Experts Group.

The term "MPEG decoder," as used herein, refers to a device that may be used to decode the MPEG stream.

The term "MPEG partial encoder," as used herein, refers to a device that may be used to encode (or re-encode) an MPEG stream, wherein elements of the process used in a conventional MPEG encoder, used to encode an MPEG stream, are eliminated.

The term "current frame," as used herein, refers to a frame that is currently being decoded or encoded.

The term "reference frame," as used herein, refers to a previously encoded frame that may be used to encode a current frame.

The term "frame mode," as used herein, refers to a process of encoding an MPEG stream using a frame by frame basis, wherein a frame is a single photographic image.

The term "field mode," as used herein, refers to a process of encoding an MPEG stream using a field by field basis, wherein two fields comprise a single photographic image.

The term "inter mode," as used herein, refers to the use of reference frames to encode an MPEG stream.

The term "intra mode," as used herein, refers to the encoding of a frame only with reference to information contained within the current frame and without reference to previously encoded frames.

The term "macroblock," as used herein, refers to a term used in video compression, which may represent a block of 16 by 16 pixels in the frame mode and a block of 16 by 8 pixels in the field mode.

The term "motion compensation," as used herein, refers to the process of inter picture prediction using reference frames.

The term "motion estimation," as used herein, refers to the process of obtaining a motion vector.

The term "entropy coding," as used herein, refers to coding of data based upon the information content of a message transmitted using the data.

The term "macroblock-adaptive frame/field coding (or MBAFF)," as used herein, refers to a video encoding feature that allows an encoder to examine each MB in a frame to look for similarities with reference MBs and to encode the MB in the inter mode or the intra mode depending on the level of motion from one field to another.

The term "I picture," as used herein, refers to a picture that is encoded in the intra mode. Additionally, an I picture is coded without temporal prediction.

The term "P picture," as used herein, refers to a picture that is encoded using prediction. The P picture may be encoded using a previous I picture or a previous P picture and forward prediction.

The term "B picture," as used herein, refers to a picture that is encoded using bi-directional prediction. The B picture may be encoded using either a previous or a next I picture (or alternately a next P picture or a next B picture) as a reference frame.

The term "pel resolution," as used herein, refers to a metric that may be used to measure the level of detail contained in picture elements (called pels or alternately pixels).

The term "metadata," refers to data about other data, for instance, embedded data indicating attributes of content data. Content data may comprise photographic or video images. Often, metadata provides information regarding the structure or schema of the content data. For example, metadata describes whether the content data is in frame or field mode and whether the content data is in intra or inter mode.

The term "coding cost," as used herein, refers to a metric that may be used to evaluate the cost of encoding an MPEG stream. Coding costs may be a combination of coding distortion and bit-rate.

The term "lower cost mode," as used herein, refers to a mode of encoding an MB with a coding cost that is lower with respect to another mode of encoding the MB.

FIG. 1 illustrates a simplified block diagram of a system 100 configured to transcode a first MPEG stream 104 to a second MPEG stream 144. The system 100 may comprise a transcoder configured to transcode an MPEG-2 stream into an MPEG-4 stream. The system 100 is comprised of a first MPEG decoder 102 and a second MPEG encoder 124. It should be understood that the system 100 depicted in FIG. 1 may include additional components and that some of the components described herein may be removed and/or modified without departing from a scope of the system 100.

The first MPEG decoder 102 is configured to receive the first MPEG stream 104. According to an embodiment, the first MPEG stream 104 may comprise a video stream broadcast in an MPEG-2 format. The first MPEG decoder 102 includes components that may be used to decode the first MPEG stream 104 including an entropy decoder 106, an inverse transformer 108, an inverse quantizer 110, a motion compensator 112, and a spatial predictor 114. The components 106-114 may comprise software modules, hardware modules, a combination of software and hardware modules, or an application specific integrated circuit (ASIC). Thus, in one embodiment, one or more of the modules 106-114 comprise circuit components. In another embodiment, one or more of the modules 106-114 comprise software code stored on a computer readable storage medium, which is executable by a processor. In another embodiment, the modules 106-114 comprise an ASIC.

The first MPEG decoder 102 may fully decode the first MPEG stream 104. The decoded information may include a picture information 116, a frame/field information 118, and an intra/inter information 120. Additionally, the decoded information may include a motion vector (MV) information 122 indicating at least one MV in inter mode. The picture information 116, the frame/field information 118, the intra/inter information 120, and the MV information 122 comprise identified metadata, which indicates how the information was encoded in the first MPEG stream 104 and may be used to determine how to re-encode the decoded information into the second MPEG stream 144. The picture information 116 comprises metadata at a picture level and may include a picture type, and a picture level frame/field mode. The picture type indicates whether the picture is an I picture, a P picture, or a B picture. The frame/field information 118 comprises metadata at the picture level and indicates whether a macroblock (MB) is encoded in one of a frame mode or a field mode. The metadata therefore indicates whether the picture is a frame picture or a field picture. The intra/inter information 120 comprises metadata at a MB level and indicates whether the MB is encoded in one of an intra mode or an inter mode at the MB level. The decoded information from the first MPEG decoder 102 is input to the second MPEG decoder 124.

The second MPEG encoder 124 receives the decoded information from the first MPEG decoder 102. The second MPEG encoder 124 may comprise an MPEG encoder or alternately, a partial MPEG encoder configured to reuse directly some of the decoded information from the first MPEG stream 104 to re-encode the decoded information as the second MPEG stream 144 in an MPEG format that is different from the MPEG format of the first MPEG stream 104. According to an embodiment, the second MPEG stream 144 may comprise a video stream broadcast in an MPEG-4 format, for instance MPEG-4 part 10. The second MPEG encoder may also be configured to determine metadata required to re-encode the decoded information into the second MPEG stream 144 from the identified metadata contained in the decoded information of the first MPEG stream 104.

The second MPEG encoder 124 includes a transformer 126, a quantizer 128, an entropy coder 130, an inverse quantizer 132, an inverse transformer 134, a deblocker 136, a ref buffer 138, a motion estimation (ME) refiner 140, and a spatial predictor 142. The components 126-142 may comprise software modules, hardware modules, a combination of software and hardware modules, or an application specific integrated circuit (ASIC). Thus, in one embodiment, one or more of the modules 126-142 comprise circuit components. In another embodiment, one or more of the modules 126-142 comprise software code stored on a computer readable storage medium, which is executable by a processor. In another embodiment, the modules 126-142 comprise an ASIC.

The second MPEG encoder 124 encodes the decoded information from the first MPEG decoder 102 into the second MPEG stream 144 by processes described in detail below with respect to FIGS. 2-5D.

It will be apparent that the transcoder 100 may include additional elements not shown and that some of the elements described herein may be removed, substituted and/or modified without departing from the scope of the transcoder 100. It should also be apparent that one or more of the elements described in the embodiment of FIG. 1 may be optional.

An example of a method in which the transcoder 100 may be employed for transcoding a first MPEG stream 104 to a second MPEG stream 144 now be described with respect to the following flow diagrams of the methods 200-500 depicted in FIGS. 2-5D. It should be apparent to those of ordinary skill in the art that the methods 200-500 represents a generalized illustration and that other steps may be added or existing steps may be removed, modified or rearranged without departing from the scopes of the methods 200-500. Also, the methods 200-500 are described with respect to the system 100 by way of example and not limitation, and the methods 200-500 may be used in other systems.

The methods 200-500 may pertain to various types of metadata, at different levels, used to encode MPEG streams, including the first MPEG stream 104 and the second MPEG stream 144. These include metadata represented in the decoded information as a picture information 116, a frame/field information 118, an intra/inter information 120, and a MV information 122. As such, steps of re-encoding within the different methods 200-500 may be equivalent, alternative and/or performed concurrently on the decoded information.

Some or all of the operations set forth in the methods 200-500 may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

Figure 2:
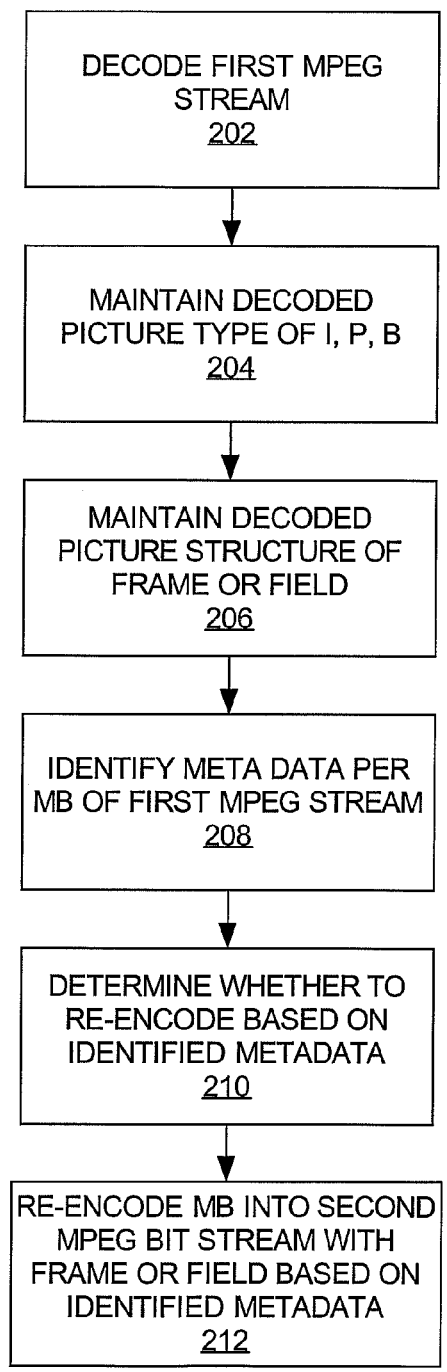
FIG. 2 illustrates a flow diagram of a method of transcoding a first MPEG stream into a second MPEG stream using picture level metadata, according to an embodiment of the invention.

At step 202, as shown in FIG. 2, the first MPEG decoder 102 decodes the first MPEG stream 104. The decoded information includes a picture information 116, a frame/field information 118, and an intra/inter information 120. Additionally, the decoded information may include a MV information 122. The first MPEG decoder 102 then outputs the decoded information to the second MPEG encoder 124.

At step 204, the second MPEG encoder 124 uses metadata, including the picture type, to re-encode the decoded information into the second MPEG stream 144 in an MPEG format that is different from the MPEG format of the first MPEG stream 104. At picture level, the second MPEG encoder 124 maintains the picture type and in addition, may maintain all other picture network information. For instance, if the picture decoded by the first MPEG decoder 104 is a one of an I picture, a P picture, and a B picture, the second MPEG encoder 124 may re-encode the picture as the picture type in which it was decoded.

At step 206, if the picture decoded by the first MPEG decoder 104 is one of a picture and a field mode picture, the second MPEG encoder 124 re-encodes the picture in the mode (frame mode or field mode) in which it was decoded. The second MPEG encoder 124 thus maintains the picture as a field picture in the second MPEG stream if the picture was an field picture in the first MPEG stream. Alternately, if the picture was a frame picture in the first MPEG stream, the second MPEG encoder 124 maintains the picture as a frame picture in the second MPEG stream.

At step 208, the second MPEG encoder 124 identifies the metadata per MB in the decoded information of the first MPEG stream.

At step 210, If the picture was encoded in the field mode and is an I picture, the second MPEG encoder 124 encodes the field picture only in the intra mode. However, if the picture was encoded in the field mode and is a P picture or a B picture, the second MPEG encoder 124 determines whether to encode the P field picture or the B field picture in any of the intra mode and the inter mode by processes described in detail below with respect to FIGS. 3A, 4A, and 5A.

At step 212, the second MPEG encoder 124 re-encodes the MB into the second MPEG stream 144 based upon the determination described in detail below with respect to FIGS. 3A, 4A, and 5A. The second MPEG encoder 124 re-encodes the MB pair (when MBAFF is enabled) or the MB (when MBAFF is disabled) using one of the frame mode and the field mode.

Figure 3A:
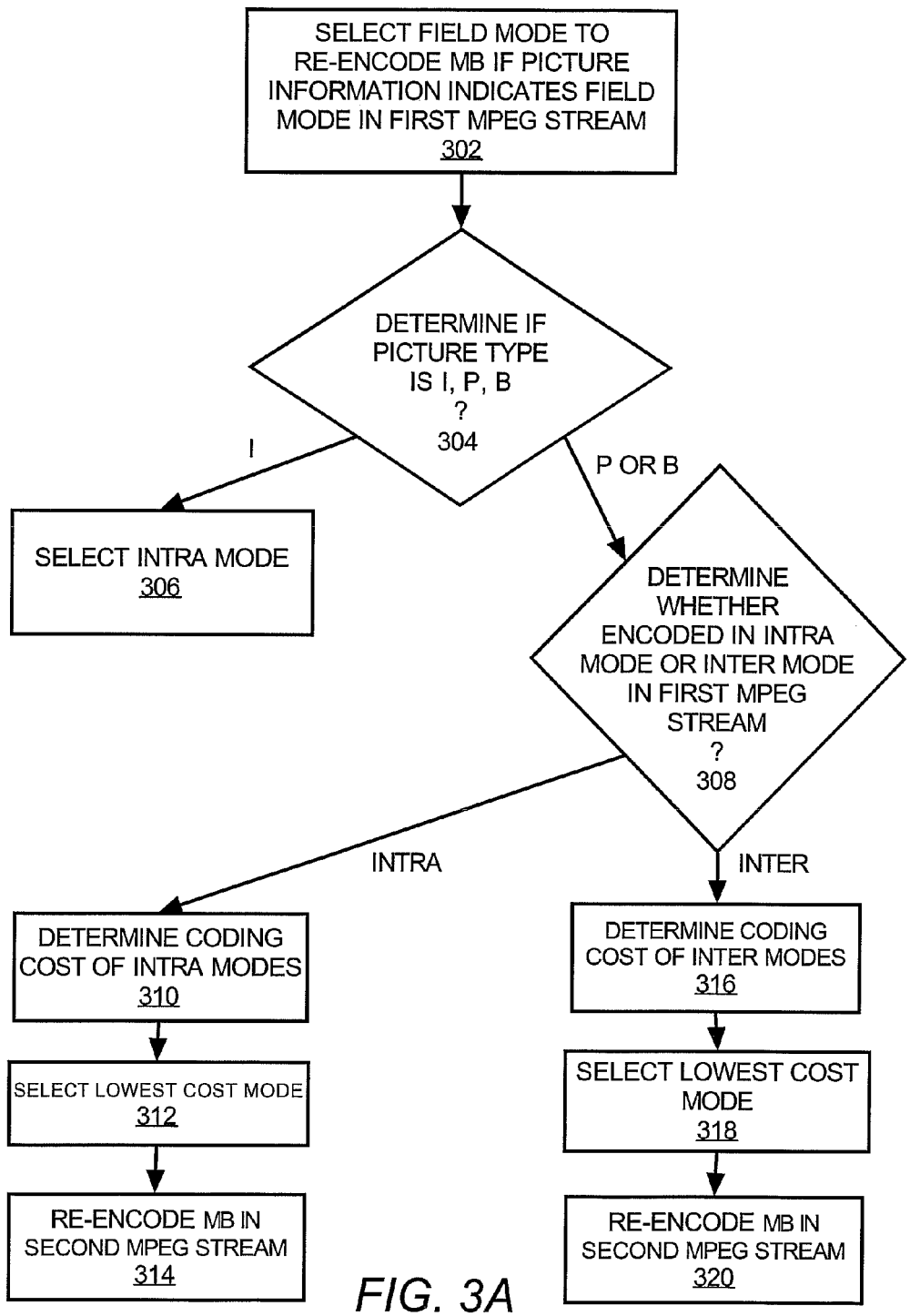
FIG. 3A illustrates a flow diagram of a method selecting an intra mode or inter mode to re-encode a MB, according to an embodiment of the invention.

With respect to FIG. 3A, at step 302, if a picture information 116 indicates that the picture was encoded in the field mode in the first MPEG stream 104, the second MPEG encoder 124 selects the field mode to re-encode the MB in the second MPEG stream 144.

At step 304, the second MPEG encoder 124 uses the picture information 116 to determine whether the picture was encoded in the first MPEG stream 104 as an I picture, or one of a P picture and a B picture.

At step 306, if the second MPEG encoder 124 determines that the picture was encoded as an I picture, the second MPEG encoder 124 selects an intra mode to re-encode the MB into the second MPEG stream 144.

At step 308, if the second MPEG encoder 124 determines that the picture was encoded as one of a P picture and a B picture, the second MPEG encoder 124 determines whether the MB was coded in the intra mode or in the inter mode in the first MPEG stream 104.

At step 310, if the second MPEG encoder 124 determines following step 308 that the MB was coded in the intra mode in the first MPEG stream 104, the second MPEG encoder 124 determines the coding cost of available intra modes. After determining the coding cost of intra mode 4×4, intra mode 8×8 and intra mode 16×16, the second MPEG encoder 124 selects the lowest cost mode at step 312 and re-encodes the MB in the second MPEG stream at step 314.

At step 314, the second MPEG encoder 124 re-encodes the MB in the second MPEG stream 144.

At step 316, if the second MPEG encoder 124 determines following step 308 that the MB was coded in the inter mode in the first MPEG stream 104, the second MPEG encoder 124 determines the coding cost of available inter modes. The second MPEG encoder 124 may determine the cost of inter mode 8×8, inter mode 8×16, inter mode 16×8, and inter mode 16×16 as described in FIG. 3B. At step 318, the second MPEG encoder 124 selects the lowest cost mode to re-encode the MB in the second MPEG stream 144.

At step 320, the second MPEG encoder 124 re-encodes the MB in the second MPEG stream 144.

Figure 3B:
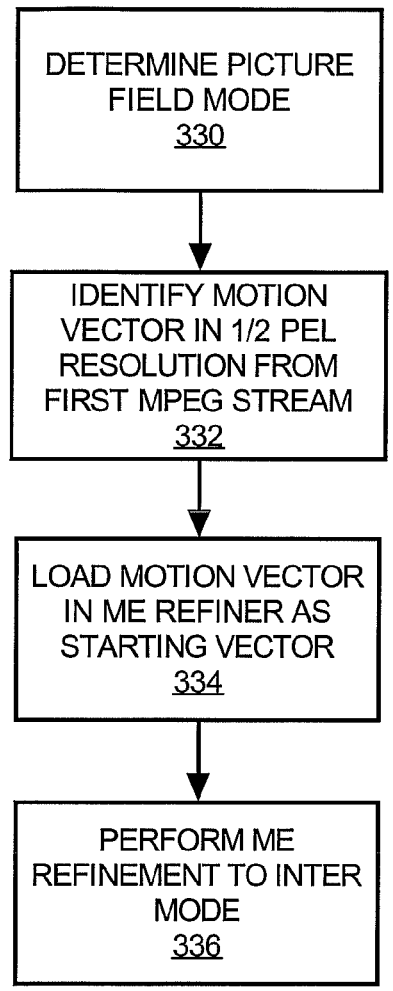
FIG. 3B illustrates a flow diagram of a method of re-encoding a MB using a refined motion vector, according to an embodiment of the invention.

With respect to FIG. 3B, at step 330, if the picture type indicated by a picture information 116 of the first MPEG stream 104 is a field picture, the second MPEG encoder 124 is configured to identify a decoded MV in the first MPEG stream 104 at step 332.

At step 334, the MV is loaded into the ME refiner 140 as a starting vector. At step 336, the second MPEG encoder 124 performs ME refinement on the starting vector for each partition of inter modes allowed in the second MPEG format including inter mode 8×8, inter mode 8×16, inter mode 16×8, and inter mode 16×16.

Figure 4A:
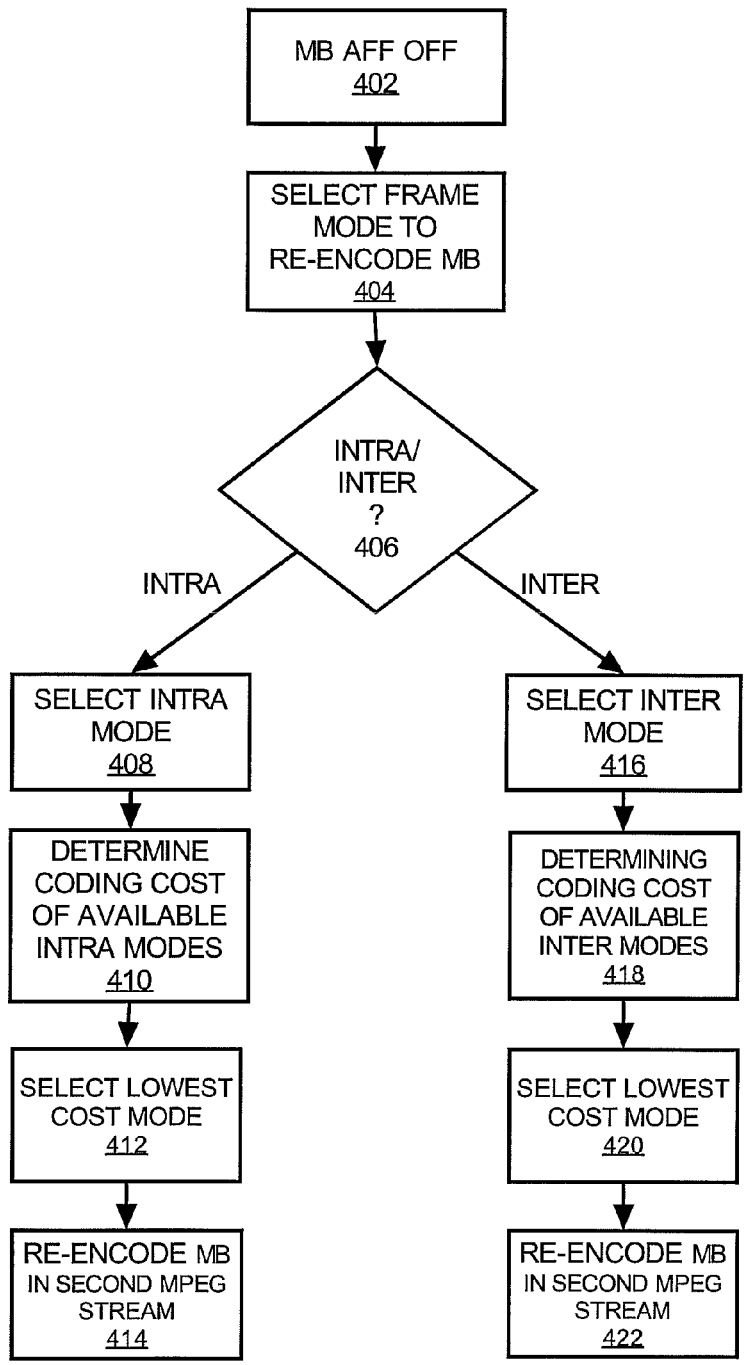
FIG. 4A illustrates a flow diagram of a method of using the transcoder with an MBAFF off, according to an embodiment of the invention.

With respect to FIG. 4A, at step 402, if a picture information 116 indicates that the picture was encoded in the frame mode in the first MPEG stream 104, the second MPEG encoder 124 determines that a MBAFF is off.

At step 404, the second MPEG encoder 124 selects the frame mode to re-encode the MB. The second MPEG encoder 124 selects the frame mode regardless of a frame/field information 118 indication that the MB was encoded in the frame mode or in the field mode in the first MPEG stream 104.

At step 406, the second MPEG encoder uses an intra/inter information 120 to determine whether the MB was encoded in the intra mode or the inter mode in the first MPEG stream.

At step 408, if an intra/inter information 120 indicates that the MB was encoded in the intra mode in the first MPEG stream, the second MPEG encoder 124 selects the intra mode to re-encode the MB in the second MPEG stream 144.

At step 410, the second MPEG encoder 124 determines the coding cost of available intra modes. After determining the coding cost of intra mode 4×4, intra mode 8×8 and intra mode 16×16, the second MPEG encoder 124 selects the lowest cost mode at step 412 and re-encodes the MB in the second MPEG stream at step 414.

At step 416, if the intra/inter information 120 indicates that the MB was encoded in the inter mode in the first MPEG stream, the second MPEG encoder 124 selects the inter mode to re-encode the MB in the second MPEG stream 144. At step 418, the second MPEG encoder 124 determines the coding cost of available inter modes as described in FIG. 4B. After determining the coding cost of inter mode 8×8, inter mode 8×16, inter mode 16×8, inter mode 16×16 and other available inter modes in the second MPEG format, the second MPEG encoder 124 selects the lowest cost mode at step 420 and re-encodes the MB in the second MPEG stream 144 at step 422.

Figure 4B:
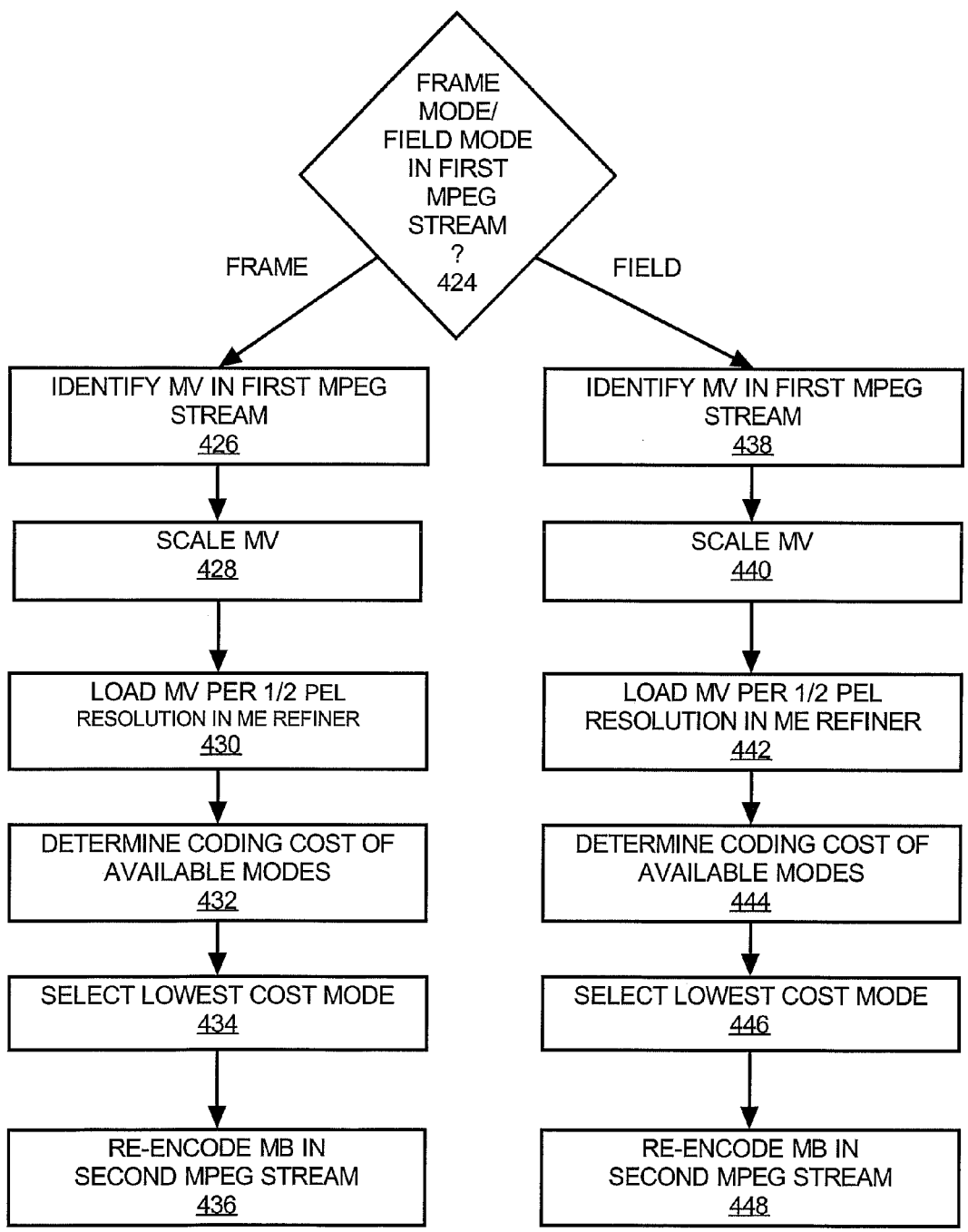
FIG. 4B illustrates a flow diagram of a method of re-encoding a MB using a refined motion vector, according to an embodiment of the invention.

At step 424, as shown in FIG. 4B, the second MPEG encoder 124 determines whether the MB was encoded in one of the frame mode and the field mode in the first MPEG stream 104 using a frame/field information 118.

At step 426, if the frame/field information 118 of the MB indicates that the MB was encoded in the frame mode in the first MPEG stream 104, the second MPEG encoder 124 identifies a decoded MV in ½ pel resolution in the first MPEG stream 104.

At step 428, the second MPEG encoder 124 scales the MV from the first MPEG stream 104.

At step 430, the second MPEG encoder 124 uses the decoded MV as a starting MV in the ME refiner 140.

At step 432, the second MPEG encoder 124 performs ME refinement on the starting MV for each partition of inter modes allowed in the second MPEG format including inter mode 8×8, inter mode 8×16, inter mode 16×8, and inter mode 16×16.

At step 434, the second MPEG encoder 124 selects the lowest cost mode and re-encodes the MB into the second MPEG stream 144 using the refined MV at step 436.

At step 438, if the frame/field information 118 of the MB indicates that the MB was encoded in the field mode in the first MPEG stream 104, the second MPEG encoder 124 identifies a decoded MV in ½ pel resolution in the first MPEG stream 104.

At step 440, the second MPEG encoder 124 scales the MV from the first MPEG stream 104. For instance, two 8×16 MVs from the first MPEG stream 104 may be scaled to a single 16×16 MV in the second MPEG stream 144.

At step 442, the second MPEG encoder 124 uses the MV as a starting MV in the ME refiner 140. At step 444, the second MPEG encoder 124 performs ME refinement on the starting MV for each partition of inter modes allowed in the second MPEG format including inter mode 8×8, inter mode 8×16, inter mode 16×8, and inter mode 16×16.

The second MPEG encoder 124 selects the lowest cost mode at step 446 and re-encodes the MB into the second MPEG stream 144 using the refined MV at step 448.

Figure 5A:
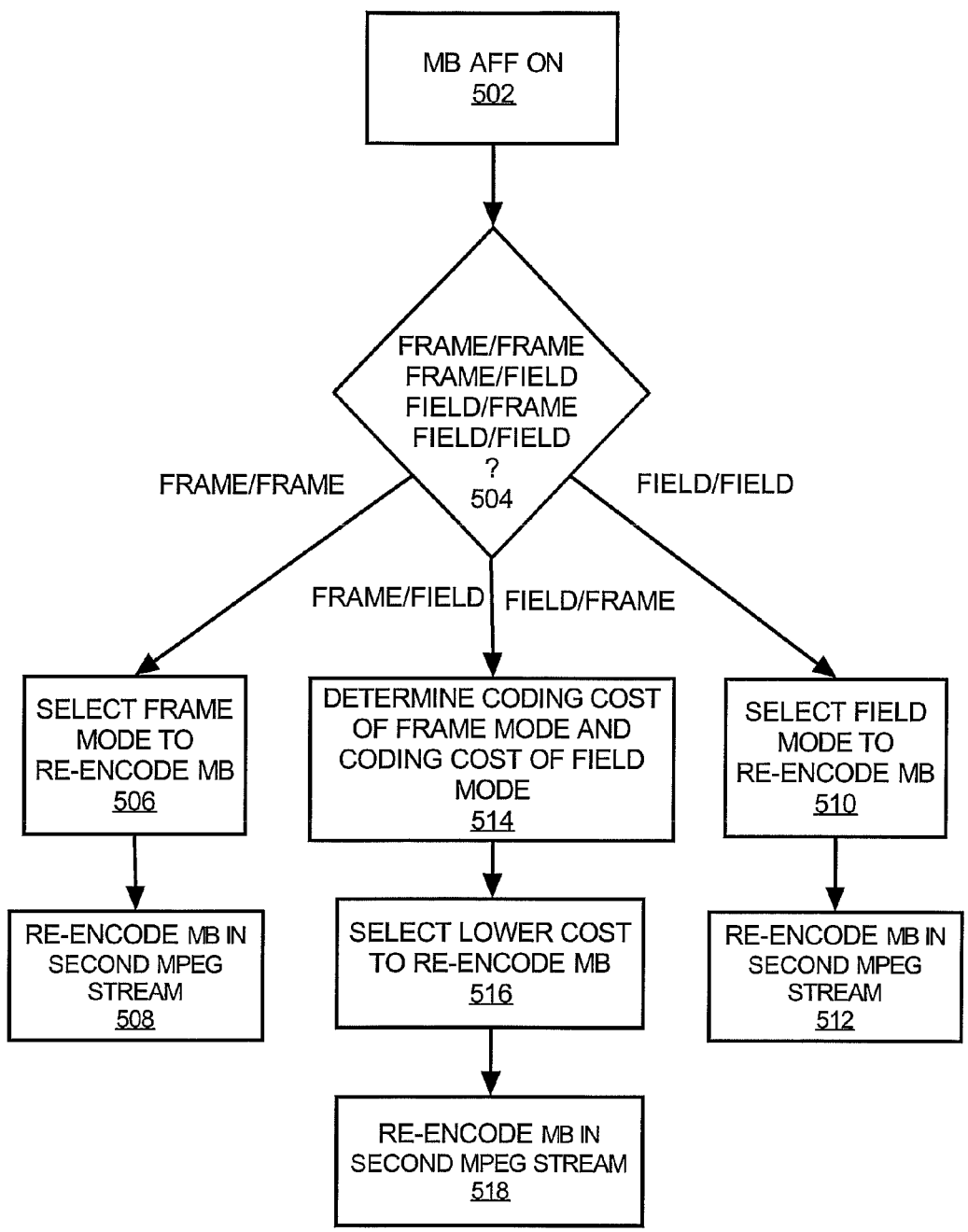
FIG. 5A illustrates a flow diagram of a method of using the transcoder with an MBAFF on, according to an embodiment of the invention.

With respect to FIG. 5A, if a picture information 116 indicates that the picture was encoded in the frame mode in the first MPEG stream 104, at step 502, the second MPEG encoder 124 determines that a MBAFF is on.

At step 504, the second MPEG encoder 124 determines whether the two MBs from the first MPEG stream 104 were encoded with both MBs in frame mode, both MBs in field mode or one MB in frame mode and the other in field mode.

At step 506, if the second MPEG encoder 124 determines that the two MBs from the first MPEG stream 104 were encoded with both MBs in the frame mode, the second MPEG encoder 124 selects the frame mode to re-encode the MB in the second MPEG stream 144. At step 508, the second MPEG encoder 124 re-encodes the MB pair into the second MPEG stream 144.

At step 510, if the second MPEG encoder 124 determines from the identified metadata that the two MBs from the first MPEG stream 104 were encoded with both MBs in the field mode, the second MPEG encoder 124 selects the field mode to re-encode the MB in the second MPEG stream 144. At step 512, the second MPEG encoder 124 re-encodes the MB pair into the second MPEG stream 144.

At step 514, the second MPEG encoder 124 determines from the identified metadata that the two MBs were encoded in the frame mode for one MB and the field mode for the other MB in the first MPEG stream 104. The second MPEG encoder 124 then determines a coding cost of the field mode and a coding cost of the frame mode and selects a lower cost mode to re-encode the MB pair at step 516.

At step 518, the second MPEG encoder 124 re-encodes the MB in the second MPEG stream 144 using the lower cost mode.

Thereafter, the second MPEG encoder 124 may use the inter/intra information 120 in order to re-encode the MB in the second MPEG stream 144 in the manner described in steps 406-416 with respect to FIG. 4A.

When re-encoding an MB in inter mode, the second MPEG encoder 124 determines the starting MV(s) from the decoded MV(s) in ½ pel resolution, and performs ME refinement around the starting MV(s) to quarter-pel resolution.

Figure 5B:
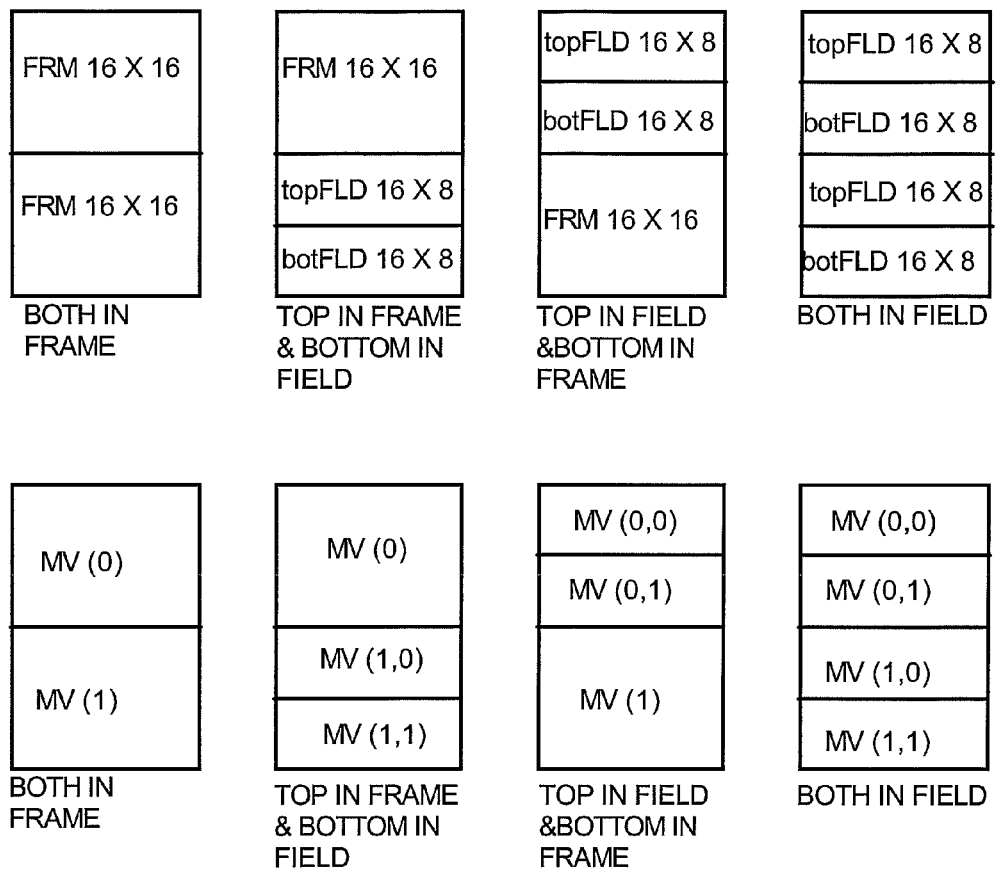
FIG. 5B illustrates possible frame/field combinations of two decoded MBs in a first MPEG and corresponding frame/field MBs for two decoded MBs.

The possible frame/field combinations of two decoded MBs in the first MPEG stream 104 and the corresponding frame/field MV(s) for the two decoded MBs in the first MPEG stream 104 are shown in FIG. 5B. If one of two MBs in the first MPEG stream 104 is in the intra mode, the second MPEG encoder 124 sets the MV(s) equal to the MV(s) of the other MB. If both MBs in MPEG-2 are in intra mode, the second MPEG encoder 124 sets the MV(s) of both MBs to zero.

In a P picture, a frame MB may have one forward frame MV, and a field MB may have two forward field MVs, one for each of two fields. In a B picture, a frame MB may have one forward frame MV and/or one backward frame MV, and a field MB may have two forward field MVs, one for each of the two fields, and/or two backward field MVs, one for each of two fields. Let MV(i)(x,y) be the frame MV and MV(i,j)(x,y) be the field MV per temporal direction in the first MPEG stream 104, where i={0,1} and j={0,1} are respectively the MB index, 0 for top MB and 1 for bottom MB, and the field index, 0 for top field and 1 for bottom field, and x and y are respectively the horizontal and vertical components of MV(i).

As described in steps 508, 512, 518, the MB may be re-encoded into the second MPEG stream 144 as one of a frame MB pair as will be described with respect to FIG. 5C and a field MB pair as will be described with respect to FIG. 5D, hereinafter.

Figure 5C:
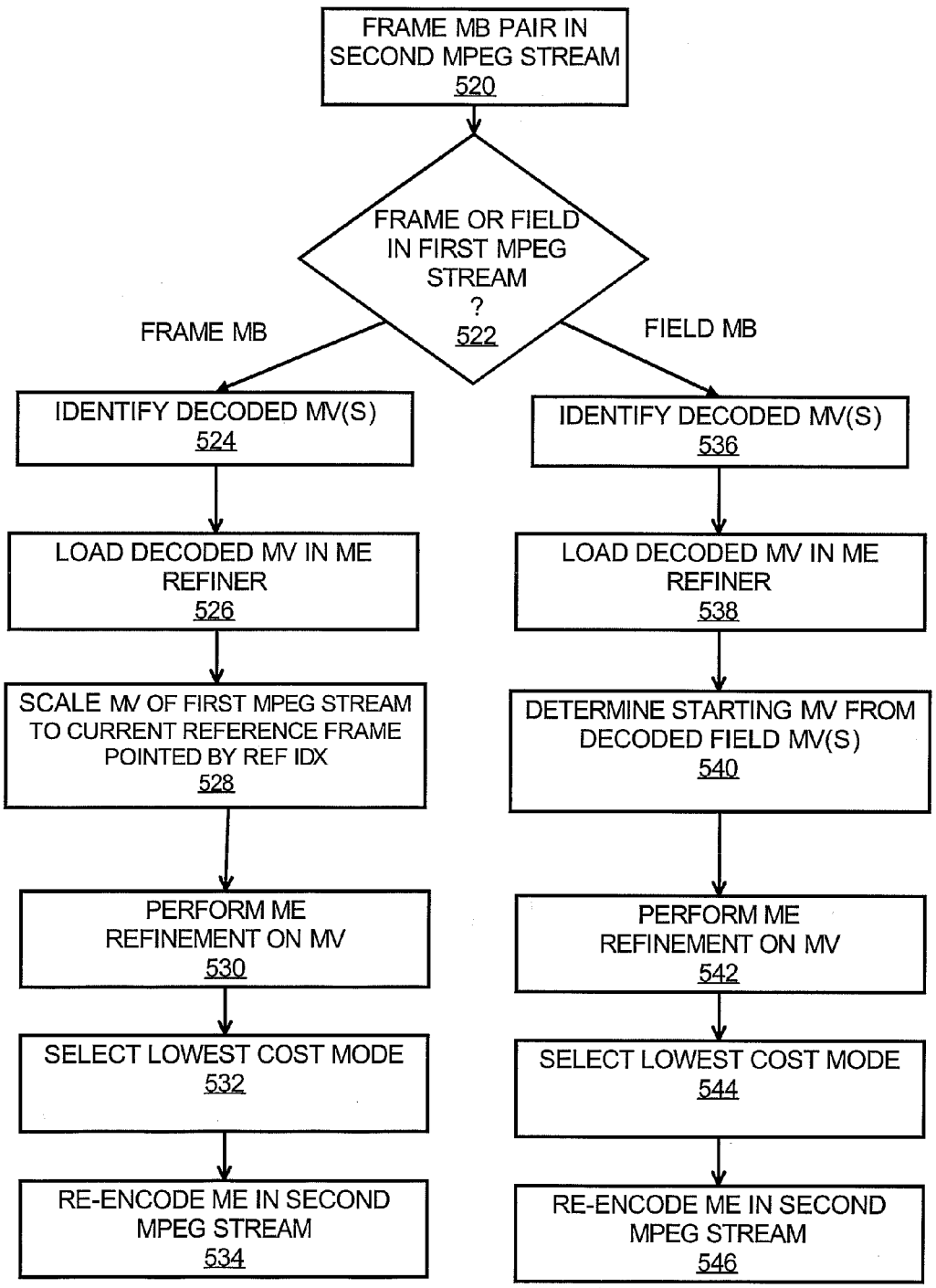
FIGS. 5C-5D provide flow charts illustrating how a MB may be re-encoded into a second MPEG stream as one of a frame MB pair or a field MB pair.

As shown in FIG. 5C, at step 520, the second MPEG encoder 124 may be configured to re-encode the MB from the first MPEG stream 104 into the second MPEG stream 144. A frame MB pair in the second MPEG stream 144 shares the pixels with the corresponding two MBs, in either frame or field, in the first MPEG stream 104. When performing ME refinement for a frame MB in second MPEG encoder 124, the starting MV(s) are derived from the decoded MV(s) of the same MB in the first MPEG stream 104.

At step 522, the second MPEG encoder 124 determines whether the MB was encoded as one of a frame MB and a field MB in the first MPEG stream 104.

At step 524, If the MB in the first MPEG stream 104 is also in the frame mode, the second MPEG encoder 124 identifies the corresponding decoded MV(s) of the first MPEG stream 104.

At step 526, the decoded MV(s) of the first MPEG stream 104 may be loaded into an ME refiner 140. The second MPEG encoder 124 is configured to determine the starting MV for the i th MB in the second MPEG stream 144 from the decoded frame MV of the first MPEG stream 104.

Specifically, at step 528, the second MPEG encoder begins ME refinement in the second MPEG stream 144 for MB partition of N×M pixels within the i th MB of the current MB pair. The second MPEG encoder 124 starts with the frame MV in the first MPEG stream 104 scaled to the current reference frame pointed by refldx, that is, $$MV_{NxM}(i) = MV(i) \times \frac{T_{SECOND}(i)}{T_{FIRST}(i)}$$

where $T_{SECOND}(i)$ is the temporal distance from the i th MB to the reference frame pointed by $MV_{NxM}$ in the second MPEG stream 144, and $T_{FIRST}(i)$ is the temporal distance from the i th MB to the reference frame pointed by MV(i) in the first MPEG stream 104. The second MPEG encoder 124, performs and completes the process of ME refinement at step 530.

At step 532, the second MPEG encoder 124 selects a lowest cost mode to re-encode the MB in the second MPEG stream 144.

At step 534, the second MPEG encoder 124 re-encodes the MB in the second MPEG stream 144.

At step 536, if the MB in the first MPEG stream 104 is in field mode, the starting MV for the i th MB is determined from the two decoded field MVs. The second MPEG encoder 124 first identifies the decoded MV(s) in the first MPEG stream 104.

At step 538, the starting MV(s) are loaded in the ME refiner 140. Specifically, ME refinement in the second MPEG stream 144 for MB partition of N×M pixels within the i th MB of the current MB pair may start with the average of the two field MVs in the first MPEG stream 104, $$MV_{NxM}(i) = \frac{1}{2}\left(MV(i, 0) \times \frac{T_{SECOND}(i)}{T_{FIRST}(i, 0)} + MV(i, 1) \times \frac{T_{SECOND}(i)}{T_{FIRST}(i, 1)}\right)(x/2, y)$$

or the one with smaller ME cost, for example MV(i,j), j=0,1, $$MV_{NxM}(i) = MV(i, j) \times \frac{T_{SECOND}(i)}{T_{FIRST}(i, j)},$$

or both the two field MVs separately, $$MV_{NxM}(i) = MV(i, j) \times \frac{T_{SECOND}(i)}{T_{FIRST}(i, j)} \text{ for } j = 0, 1$$

where $T_{FIRST}(i,j)$ is the temporal distance between the j the field of the i th MB to the reference field pointed by MV(i,j). After the starting MV(s) are determined at step 540, the second MPEG encoder 124, performs and completes the process of ME refinement at step 542.

At step 544, the second MPEG encoder 124 selects a lowest cost mode to re-encode the MB in the second MPEG stream 144.

At step 546, the second MPEG encoder 124 re-encodes the MB in the second MPEG stream 144.

Figure 5D:
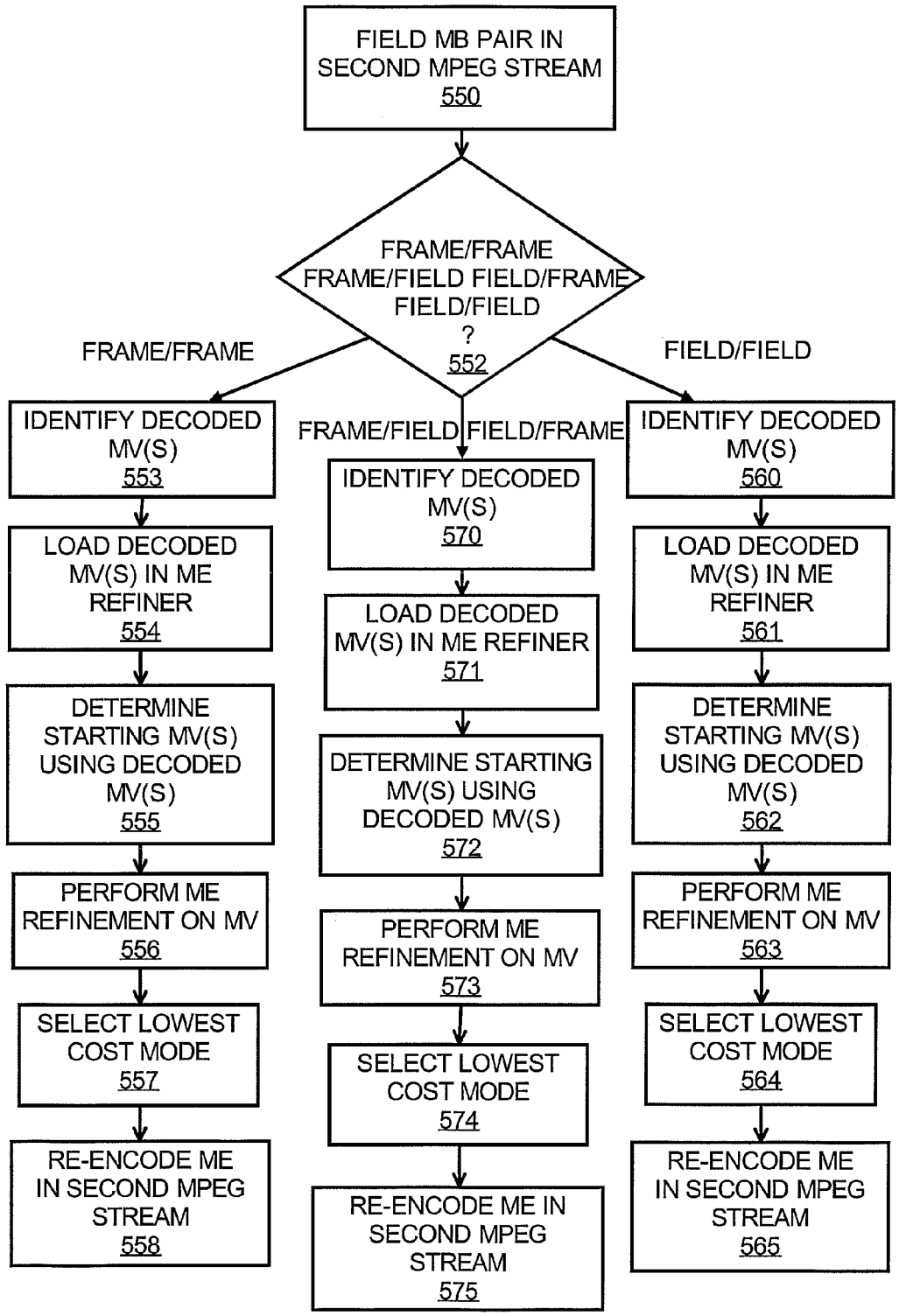

With regard now to FIG. 5D, at step 550, the second MPEG encoder 124 encodes a field MB pair in the second MPEG stream 144.

At step 552, the second MPEG encoder 124 is configured to determine whether in the first MPEG stream 104, the two MBs were encoded in one of both in field (field/field) and one in frame and the other in field (frame/field). A field MB in the second MPEG stream 144 shares some pixels from the corresponding two MBs, in either frame or field, in the first MPEG stream 104.

With regard now to FIG. 5D, at step 550, the second MPEG encoder 124 encodes a field MB pair in the second MPEG stream 144.

At step 552, the second MPEG encoder 124 is configured to determine whether in the first MPEG stream 104, the two MBs were encoded in one of both in frame (frame/frame), both in field (field field) and one in frame and the other in field (frame/field, field/frame). A field MB in the second MPEG stream 144 shares some pixels from two MBs, in either frame or field, in the first MPEG stream 104.

At step 553, If both the MBs in the first MPEG stream 104 are in frame, the second MPEG encoder 124 identifies the two decoded frame MVs from the first MPEG stream 104 and loads the decoded MVs for the i th MB in the ME refiner 140 at step 554. Specifically, ME refinement in the second MPEG stream 144 for MB partition of N×M pixels within the i th MB of the current MB pair can start with the average of the two decoded frame MVs, $$MV_{NxM}(i) = \left(MV(0) \times \frac{T_{SECOND}(i)}{T_{FIRST}(0)} + MV(1) \times \frac{T_{SECOND}(i)}{T_{FIRST}(1)}\right)(x/2, y/2/2),$$

or the one with smaller ME cost, say MV(j), j=0,1, $$MV_{NxM}(i) = \left(MV(j) \times \frac{T_{SECOND}(i)}{T_{FIRST}(j)}\right)(x, y/2)$$

or both the two MVs separately, $$MV_{NxM}(i) = \left(MV(j) \times \frac{T_{SECOND}(i)}{T_{FIRST}(j)}\right)(x, y/2)$$

Note that in the second MPEG stream 144, for a field MB pair, the MB index is equal to the field index. After the starting MV(s) are determined at step 555, the second MPEG encoder 124, performs and completes the process of ME refinement at step 556.

At step 557, the second MPEG encoder 124 selects a lowest cost mode to re-encode the MB in the second MPEG stream 144.

At step 558, the second MPEG encoder 124 re-encodes the MB in the second MPEG stream 144.

At step 560, If both MBs in the first MPEG stream 104 are in the field mode, the starting MVs for the i th MB in the second MPEG encoder 124 are derived from the identified two decoded same-field MVs. Specifically, ME refinement in the second MPEG stream 144 for MB partition of N×M pixels within the i th MB of the current MB pair may start with the average of the two decoded same-field MVs, loaded in the ME refiner at step 561, $$MV_{NxM}(i) = \left(MV(0, i) \times \frac{T_{SECOND}(i)}{T_{FIRST}(0, i)} + MV(1, i) \times \frac{T_{SECOND}(i)}{T_{FIRST}(1, i)}\right)(x/2, y/2)$$

or the one with smaller ME cost, say MV(i,j), j=0,1, $$MV_{NxM}(i) = MV(i, j) \times \frac{T_{SECOND}(i)}{T_{FIRST}(i, j)}$$

or both the two same-field MVs separately $$MV_{NxM}(i) = MV(i, j) \times \frac{T_{SECOND}(i)}{T_{FIRST}(i, j)} \text{ for } j = 0, 1$$

After the starting MV(s) are determined at step 562, the second MPEG encoder 124, performs and completes the process of ME refinement at step 563.

At step 564, the second MPEG encoder 124 selects a lowest cost mode to re-encode the MB in the second MPEG stream 144.

At step 565, the second MPEG encoder 124 re-encodes the MB in the second MPEG stream 144.

At step 570, if one of MBs in the first MPEG stream 104 is in the frame mode and the other in the field mode, the second MPEG encoder 124 identifies the decoded frame MV and the decoded same-field MV from the first MPEG stream 104 and at step 571 loads the decoded MV(s) in the ME refiner 140. At step 572, the starting MVs for the i th MB in the second MPEG encoder 124 are determined from the decoded MV(s). Specifically, ME refinement in the second MPEG stream 144 for MB partition of N×M pixels within the i th MB of the current MB pair can start with the average of the decoded frame MV and the decoded same-field MV, $$MV_{NxM}(i) = \frac{1}{2}\left(MV(0/1) \times \frac{T_{SECOND}(i)}{T_{FIRST}(0/1)}(x, y/2) + MV(1/0, i) \times \frac{T_{SECOND}}{T_{FIRST}(1/0, i)}(x/2, y/2)\right)$$

or the decoded frame MV, if it gives a smaller ME cost, $$MV_{NxM}(i) = MV(0/1) \times \frac{T_{SECOND}(i)}{T_{FIRST}(0/1)}(x, y/2)$$

or the decoded same-field MV, if it gives a smaller ME cost, $$MV_{NxM}(i) = MV(1/0, i) \times \frac{T_{SECOND}}{T_{FIRST}(1/0, i)}$$

or both the decoded frame MV and the decoded same-field MV separately, $$MV_{NxM}(i) = MV(0/1) \times \frac{T_{SECOND}(i)}{T_{FIRST}(0/1)}(x, y/2)$$

and $$MV_{NxM}(i) = MV(1/0, i) \times \frac{T_{SECOND}}{T_{FIRST}(1/0, i)}$$

After the starting MV(s) are determined at step 572, the second MPEG encoder 124, performs and completes the process of ME refinement at step 573.

At step 574, the second MPEG encoder 124 selects a lowest cost mode to re-encode the MB in the second MPEG stream 144.

At step 575, the second MPEG encoder 124 re-encodes the MB in the second MPEG stream 144.

In the first MPEG stream 104, a single forward reference frame per P picture is allowed, and a single forward reference frame and a single backward reference frame per B picture. But, in the second MPEG stream 144 multiple reference frames are allowes per temporal direction for P pictures or B pictures.

In order to determine the reference picture per MB partition in the second MPEG encoder 124, one approach is to maintain the reference picture in the first MPEG stream 104. That is, 1. In a P picture,
   a. A frame MB is only allowed to refer to the last coded I or P frame in List 0, and
   b. A field MB is only allowed to refer to the two fields of the last coded I or P frames in List 0.
2. In B,
   a. A frame MB is allowed to refer to the last coded I or P frame in past in List 0, and/or to the last coded I or P in the future in List 1, and
   b. A field MB is allowed to refer to the two fields of the last coded I or P frame in List 0, and/or to the two fields of the last coded I or P frame in the future in List 1.

A more flexible approach is to determine all the allowable references in List 0 for P, and all the allowable references in List 0 and List 1 for B, and select the one with lowest coding cost. This approach may provide better performance than the prior approach, but at the expense of more processing time.

Figure 6:
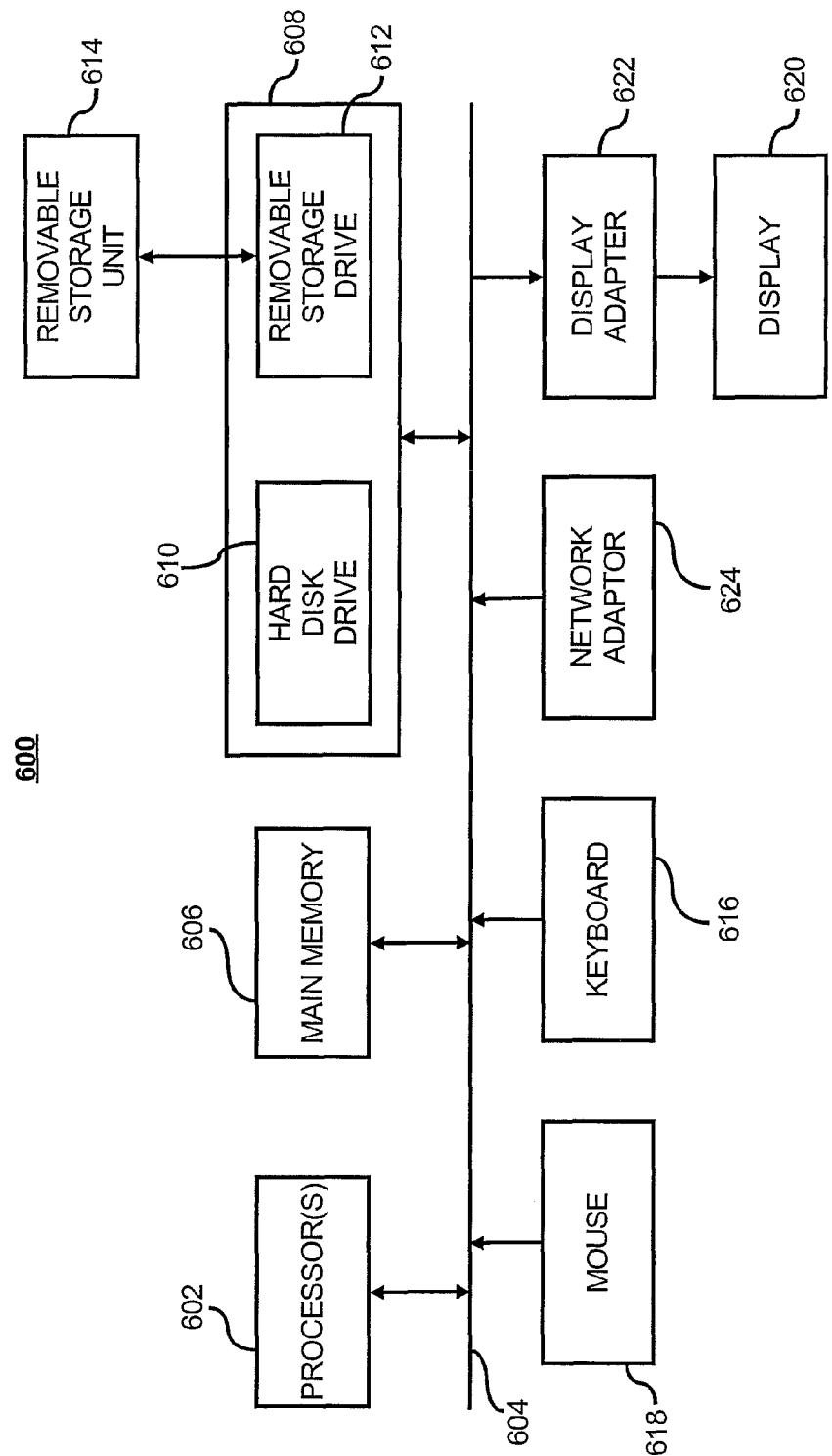
FIG. 6 shows a block diagram of a computer system 400 that may be used in the transcoder, according to an embodiment of the invention.

FIG. 6 illustrates a block diagram of a computing apparatus 600 configured to implement or execute one or more of the processes required to transcode a first MPEG stream into a second MPEG stream depicted in FIGS. 2-5B, according to an embodiment. It should be understood that the illustration of the computing apparatus 600 is a generalized illustration and that the computing apparatus 600 may include additional components and that some of the components described may be removed and/or modified without departing from a scope of the computing apparatus 600.

The computing apparatus 600 includes a processor 602 that may implement or execute some or all of the steps described in the method depicted in FIGS. 2-5. Commands and data from the processor 602 are communicated over a communication bus 604. The computing apparatus 600 also includes a main memory 606, such as a random access memory (RAM), where the program code for the processor 602, may be executed during runtime, and a secondary memory 608. The secondary memory 608 includes, for example, one or more hard disk drives 410 and/or a removable storage drive 612, representing a floppy diskette drive, a magnetic tape drive, a compact disk drive, etc., where a copy of the program code for one or more of the processes depicted in FIGS. 2-5 may be stored.

The removable storage drive 610 reads from and/or writes to a removable storage unit 614 in a well-known manner. User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor(s) 602 may communicate over a network, for instance, the Internet, LAN, etc., through a network adaptor 624.

Embodiments of the invention provide a transcoder that does not need to fully decode an MPEG-2 to baseband and then fully re-encode the baseband to MPEG-4. Instead, information needed for the MPEG-4 encoding is derived from information decoded from the MPEG-2 stream. As a result of having the derived information, which includes decisions on coding modes and motion vectors (MVs) for MPEG-4, only partial encoding is needed to convert to MPEG-4, which significantly reduces the re-encoding costs.

The transcoder may reduce cost and enable increased channel density by reducing processing load without sacrificing the compression efficiency that MPEG-4 interlace tools afford. The current alternative would be to fully decode from MPEG-2 to baseband and then re-encode from baseband to MPEG-4. This approach requires more processing resources and is less efficient than the embodiments of the invention. Embodiments of the invention also provide a concise decision tree to manage the various possible mappings between the coding decisions for MBs in the first MPEG stream and those for MBs in the second MPEG stream.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

What is claimed is:

1. A system for transcoding an input first MPEG stream to a second MPEG stream, the system comprising:
   a first MPEG decoder configured to:
      decode the first MPEG stream;
      identify metadata indicating how the first MPEG stream was encoded, the identified metadata determined during the decoding of the first MPEG steam; and
      output the identified metadata; and
   a second MPEG encoder configured to encode the second MPEG stream, wherein the second MPEG encoder is further configured to
      maintain a decoded picture type of I, P, or B;
      maintain a decoded picture structure of frame or field;
      receive the identified metadata from the first MPEG decoder;
      determine whether to re-encode a macroblock (MB) of a picture in the second MPEG stream using one of a frame or a field mode based on the identified metadata indicating how the first MPEG stream was encoded; and
      re-encode the MB using the determined frame or field mode.

2. The system of claim 1, wherein the first MPEG stream is an MPEG-2 stream and the second MPEG stream is an MPEG-4 part 10 stream.

3. The system of claim 1, wherein the second MPEG encoder is configured to:
   select the field mode to re-encode the MB of the picture in the second MPEG stream if the identified metadata indicates the picture was encoded in the field mode in the first MPEG stream; and,
   if the picture type is an I field picture, select an intra mode to re-encode the MB in the second MPEG stream;
   if the picture is one of a B field picture and a P field picture and the identified metadata indicates the MB was encoded in the intra mode in the first MPEG stream, determine a coding cost of intra modes allowed under the second MPEG format including intra mode 4×4, intra mode 8×8 and intra mode 16×16, and select a lowest cost mode to re-encode the MB in the second MPEG stream; and
   if the picture is one of a B field picture and a P field picture and the identified metadata indicates the MB was encoded in an inter mode in the first MPEG stream, determine a coding cost of inter modes allowed under the second MPEG format including inter mode 8×8, inter mode 8×16, inter mode 16×8, and inter mode 16×16, and select a lowest cost mode to re-encode the MB in the second MPEG stream.

4. The system of claim 3, wherein the second MPEG encoder is configured to:
   if inter mode is used to re-encode the MB, identify a decoded motion vector (MV) in the first MPEG stream wherein the decoded MV is in ½ pel resolution;
   use the decoded MV as a starting MV;
   determine a refined MV by performing motion estimation (ME) refinement on the starting MV for each partition of inter modes allowed in the second MPEG format including inter mode 8×8, inter mode 8×16, inter mode 16×8, and inter mode 16×16; and select the refined MV to re-encode the MB into the second MPEG stream.

5. The system of claim 1, wherein the second MPEG encoder is configured to:
select the frame mode to re-encode the MB in the second MPEG stream if the identified metadata indicates the picture was encoded in the frame mode in the first MPEG stream and a macroblock adaptive frame/field (MBAFF) is off, and
if the MB was encoded in an inter mode in the first MPEG stream, determine a coding cost of inter modes allowed under the second MPEG format including inter mode 8×8, inter mode 8×16, inter mode 16×8, and inter mode 16×16, and select a lowest cost mode to re-encode the MB in the second MPEG stream; and
if the MB was encoded in the intra mode in the first MPEG stream, determine a coding cost of intra modes allowed under the second MPEG format including intra mode 4×4, intra mode 8×8 and intra mode 16×16, and select a lowest cost mode to re-encode the MB in the second MPEG stream.

6. The system of claim 5, wherein the second MPEG encoder is configured to:
if inter mode is used to re-encode the MB and the MB was encoded in the frame mode in the first MPEG stream, identify a decoded MV in ½ pel resolution in the first MPEG stream;
use the decoded MV as a starting MV;
determine a refined MV performing ME refinement on the starting MV for each partition of inter modes allowed under the second MPEG format including inter mode 8×8, inter mode 8×16, inter mode 16×8, and inter mode 16×16; and
re-encode the MB into the second MPEG stream using the refined MV.

7. The system of claim 5, wherein the second MPEG encoder is configured to:
if inter mode is used to re-encode the MB and the identified metadata indicates the MB was encoded in the field mode in the first MPEG stream, identify decoded MVs in ½ pel resolution for two 8×16 MVs in the first MPEG stream;
use the decoded MVs to derive a starting MV;
determine a refined MV by performing ME refinement on the starting MV for each partition of inter modes allowed in the second MPEG format including inter mode 8×8, inter mode 8×16, inter mode 16×8, and inter mode 16×16; and
select the refined MV to re-encode the MB into the second MPEG stream.

8. The system of claim 1, wherein, if the identified metadata indicates the picture was encoded in frame mode in the first MPEG stream and a (macroblock adaptive frame/field (MBAFF) in the second MPEG stream is on, the second MPEG encoder is configured to:
select the frame mode to re-encode two MBs if the identified metadata indicates the two MBs were encoded in the frame mode in the first MPEG stream;
select the field mode to re-encode the two MBs if the identified metadata indicates the two MBs were encoded in the field mode in the first MPEG stream; and
determine a coding cost of the field mode and determine a coding cost of the frame mode for the two MBs and select a lowest cost mode to re-encode the two MBs if the identified metadata indicates the two MBs were encoded in the frame mode for one MB and the field mode for the other MB in the first MPEG stream.

9. The system of claim 8, wherein the second MPEG encoder is further configured to:
select the inter mode to re-encode the two MBs if the identified metadata indicates the two MBs were encoded in the inter mode in the first MPEG stream;
select the intra mode to re-encode the two MBs if the identified metadata indicates the two MBs were encoded in the intra mode, in the first MPEG stream; and
determine a coding cost of the intra mode and determine a coding cost of the inter mode for each MB of the two MBs and select a lowest cost mode to re-encode the MB if the identified metadata indicates the two MBs were encoded in the intra mode for one MB and the inter mode for the other MB in the first MPEG stream.

10. The system of claim 9, wherein if re-encoding a frame MB in inter mode in the second MPEG stream, the second MPEG encoder is configured to:
if the two MBs were encoded in the frame mode in the first MPEG stream:
identify at least one decoded MV in ½ pel resolution for the two MBs in the first MPEG stream;
scale the at least one decoded MV of the first MPEG stream to a current reference frame pointed by ref Idx to form at least one starting MV;
determine a refined MV by performing ME refinement around the at least one starting MV to a quarter pel resolution for each partition of inter modes allowed in the second MPEG format including inter mode 8×8, inter mode 8×16, inter mode 16×8, and inter mode 16×16;
if the two MBs were encoded in the field mode in the first MPEG stream:
identify at least one decoded MV in ½ pel resolution for the two MBs in the first MPEG stream;
determine at least one starting MV from the at least one decoded field MV;
determine a refined MV by performing ME refinement around the at least one starting MV to a quarter pel resolution for each partition of inter modes allowed in the second MPEG format including inter mode 8×8, inter mode 8×16, inter mode 16×8, and inter mode 16×16;
if the identified metadata indicates the two MBs were encoded in the frame mode for one MB and the field mode for the other MB in the first MPEG stream:
identify at least one decoded MV in ½ pel resolution for the two MBs in the first MPEG stream;
determine at least one starting MV from the at least one decoded MV; and
determine a refined MV by performing ME refinement around the at least one starting MV to a quarter pel resolution for each partition of inter modes allowed in the second MPEG format including inter mode 8×8, inter mode 8×16, inter mode 16×8, and inter mode 16×16.

11. The system of claim 9, wherein if re-encoding a field MB in inter mode in the second MPEG stream, the second MPEG encoder is configured to:
determine whether the two MBs were encoded in both the frame mode, both the field mode, or one the field mode and the frame mode in the first MPEG stream;
identify at least one decoded MV in ½ pel resolution for the two MBs in the first MPEG stream;
determine at least one starting MV from the at least one decoded MV;
determine a refined MV by performing ME refinement around the at least one starting MV to a quarter pel resolution for each partition of inter modes allowed in the second MPEG format including inter mode 8×8, inter mode 8×16, inter mode 16×8, and inter mode 16×16.

12. The system of claim 9, wherein if one MB is in intra mode and the other MB is in inter mode in the first MPEG stream, the second MPEG encoder is configured to set the starting MV of the MB in the intra mode to the MV of the other MB; and
  if the two MBs are in intra mode in the first MPEG stream, set the starting MVs to zero.

13. The system of claim 1, wherein, if a macroblock adaptive frame/field (MBAFF) is on, the second MPEG encoder is configured to determine the coding cost of the field mode and determine the coding cost of the frame mode and to select the lower cost mode to re-encode the MB pair.

14. A method of transcoding an input first MPEG stream to a second MPEG stream, the method comprising:
  at a first MPEG decoder,
    decoding the first MPEG stream;
    identifying metadata indicating how the first MPEG stream was encoded, the identified metadata determined during the decoding of the first MPEG steam; and
    outputting the metadata; and
  at a second MPEG encoder,
    maintaining a decoded picture type of I, P, or B;
    maintaining a decoded picture structure of frame or field;
    receiving the outputted metadata from the first MPEG decoder;
    determining whether to re-encode a macroblock (MB) of a picture into the second MPEG stream using one of a frame or a field mode based on the identified metadata indicating how the first MPEG stream was encoded; and
    re-encoding the MB into the second MPEG stream using the determined frame or field mode.

15. The method of claim 14, wherein determining whether to re-encode the MB into the second MPEG stream further comprises:
  selecting the field mode to re-encode the MB of the picture in the second MPEG stream if the identified metadata indicates the picture was encoded in the field mode in the first MPEG stream; and
  if the picture type is an I field picture, selecting an intra mode to re-encode the MB in the second MPEG stream;
  if the picture is one of a B and a P field picture and the identified metadata indicates the MB was encoded in the intra mode in the first MPEG stream, determining a coding cost of intra modes allowed under the second MPEG format including intra mode 4×4, intra mode 8×8 and intra mode 16×16 and selecting a lowest cost mode to re-encode the MB in the second MPEG stream; and
  if the picture is one of a B and a P field picture and the identified metadata indicates the MB was encoded in an inter mode in the first MPEG stream, determining the coding cost of inter modes allowed under the second MPEG format including inter mode 8×8, inter mode 8×16, inter mode 16×8, and inter mode 16×16 and selecting a lowest cost mode to re-encode the MB in the second MPEG stream.

16. The method of claim 15, further comprising:
  if inter mode is used to re-encode the MB, identifying at least one decoded motion vector (MV) in the first MPEG stream wherein the at least one decoded MV is in ½ pel resolution;
  using the at least one decoded MV as at least one starting MV;
  performing motion estimation (ME) refinement performing ME refinement around the at least one starting MV to a quarter pel resolution for each partition of inter modes allowed in the second MPEG format including inter mode 8×8, inter mode 8×16, inter mode 16×8, and intra mode 16×16; and
  re-encoding the MB into the second MPEG stream using the refined MV.

17. The method of claim 14, further comprising:
  selecting the frame mode to re-encode the MB if the identified metadata indicates the picture was encoded in the frame mode in the first MPEG stream and macroblock adaptive frame/field (MBAFF) is off, and
  if the MB is in an intra mode in the first MPEG stream, selecting the intra mode to re-encode the MB in the second MPEG stream;
  if the MB indicates the MB was encoded in an inter mode in the first MPEG stream, determining a coding cost of inter modes allowed under the second MPEG format including inter mode 8×8, inter mode 8×16, inter mode 16×8, and inter mode 16×16 and selecting a lowest cost mode to re-encode the MB in the second MPEG stream; and
  if the decoded information of the MB indicates the MB was encoded in the intra mode in the first MPEG stream, determining the coding cost of intra modes allowed under the second MPEG format including intra mode 4×4, intra mode 8×8 and intra mode 16×16 and selecting the lowest cost mode to re-encode the MB in the second MPEG stream.

18. The method of claim 17, further comprising:
  if the inter mode is used to re-encode the MB, identifying at least one decoded motion vector (MV) in the first MPEG stream in ½ pel resolution;
  using the at least one decoded MV as at least one starting MV;
  determining a refined MV by performing motion estimation (ME) refinement around the at least one starting MV to a quarter pel resolution for each partition of inter modes allowed in the second MPEG format including inter mode 8×8, inter mode 8×16, inter mode 16×8, and inter mode 16×16; and
  re-encoding the MB into the second MPEG stream using the refined MV.

19. The method of claim 14, further comprising,
  if the identified metadata indicates the picture was encoded in frame mode in the first MPEG stream and a macroblock adaptive frame/field (MBAFF) in the second MPEG stream is on, and if the identified metadata indicates two MBs were encoded in the frame mode in the first MPEG stream, selecting the frame mode to re-encode the two MBs;
  if the identified metadata indicates the two MBs were encoded in the field mode in the first MPEG stream, selecting the field mode to re-encode the two MBs; and
  if the identified metadata indicates the two MBs were encoded in the frame mode for one MB and the field mode for the other MB in the first MPEG stream, determining a coding cost of the field mode and determining a coding cost of the frame mode for the two MBs and selecting a lowest cost mode to re-encode the two MBs.

20. The method of claim 19, further comprising,
  selecting the inter mode to re-encode the two MBs if the identified metadata indicates the two MBs were encoded in the inter mode in the first MPEG stream;

selecting the intra mode to re-encode the two MBs if the identified metadata indicates the two MBs were encoded in the intra mode, in the first MPEG stream; and determining a coding cost of the intra mode and determining a coding cost of the inter mode for each MB of the two MBs and selecting a lowest cost mode to re-encode the MB if the identified metadata indicates the two MBs were encoded in the intra mode for one MB and the inter mode for the other MB in the first MPEG stream.

21. The method of claim 20, further comprising, if re-encoding a MB in inter mode in the second MPEG stream, identifying at least one decoded motion vector (MV) in ½ pel resolution in the first MPEG stream;

determining at least one starting MV from the at least one decoded MV; and determining a refined MV by performing motion estimation (ME) refinement around the at least one starting MV to a quarter pel resolution for each partition of inter modes allowed in the second MPEG format including inter mode 8×8, inter mode 8×16, inter mode 16×8, and inter mode 16×16.

22. The method of claim 14, further comprising:

determining a reference picture per MB partition in the second MPEG encoder by using the reference picture in the first MPEG stream;

wherein determining the reference picture per MB partition in the second MPEG encoder by maintaining the reference picture in the first MPEG stream for a P picture comprises allowing a frame MB to refer only to the last coded I or P frame in List 0, and allowing a field MB to refer only to two fields of the last coded I or P frames in List 0; and wherein determining the reference picture per MB partition in the second MPEG encoder by maintaining the reference picture in the first MPEG stream for a B picture comprises allowing a frame MB to refer to at least one of a last coded I or P frame in List 0 and a last coded I or P frame in List 1, and allowing a field MB to refer to at least one of two fields of the last coded I or P frame in List 0 and two fields of the last coded I or P frame in List 1.

23. A non-transitory computer readable storage medium storing at least one computer program that when executed performs a method for transcoding an input first MPEG stream to a second MPEG stream, the method comprising:

at a first MPEG decoder, decoding the first MPEG stream;

identifying metadata indicating how the first MPEG stream was encoded, the identified metadata determined during the decoding of the first MPEG steam; and outputting the identified metadata; and at a second MPEG encoder, maintaining a decoded picture type of I, P, or B;

maintaining a decoded picture structure of frame or field;

receiving the identified metadata from the first MPEG decoder;

determining whether to re-encode a macroblock (MB) of a picture into the second MPEG stream using one of a frame or a field mode based on the identified metadata indicating how the first MPEG stream was encoded; and re-encoding the MB into the second MPEG stream using the determined frame or field mode.

* * * * *